United States Patent
Tan et al.

(10) Patent No.: US 11,861,076 B1
(45) Date of Patent: Jan. 2, 2024

(54) SYSTEM AND METHOD FOR OBTAINING USER INPUT WITH MAGNETIC SENSING

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/149,803

(22) Filed: Jan. 4, 2023

(51) Int. Cl.
*G06F 3/033* (2013.01)
*G06F 3/01* (2006.01)
*G06F 3/02* (2006.01)

(52) U.S. Cl.
CPC ............. *G06F 3/033* (2013.01); *G06F 3/016* (2013.01); *G06F 3/02* (2013.01)

(58) Field of Classification Search
CPC ............. G06F 3/033; G06F 3/016; G06F 3/02
See application file for complete search history.

(56) References Cited

U.S. PATENT DOCUMENTS

| | | | |
|---|---|---|---|
| 8,368,649 B2 * | 2/2013 | Hall | G06F 3/046 345/163 |
| 2010/0053085 A1 * | 3/2010 | Hall | G06F 3/046 345/163 |
| 2019/0187856 A1 * | 6/2019 | Bruwer | G06F 3/046 |
| 2020/0004346 A1 * | 1/2020 | Vlasov | G06F 3/03543 |

* cited by examiner

*Primary Examiner* — Afroza Chowdhury
(74) *Attorney, Agent, or Firm* — Womble Bond Dickinson (US) LLP

(57) ABSTRACT

Methods and systems for providing computer implemented services using user input are disclosed. To obtain the user input, a passive human interface device may be used. The human interface device may include a magnet that may produce a magnetic field used to discern the user input. The magnet may be mechanically coupled to actuatable portions of the human interface device thereby facilitating both translation and rotation of the magnet responsive to actuations by a user. The translation and rotation of the magnet may be sensed and used to identify user input provided by the user.

20 Claims, 15 Drawing Sheets

US 11,861,076 B1

SYSTEM AND METHOD FOR OBTAINING USER INPUT WITH MAGNETIC SENSING

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
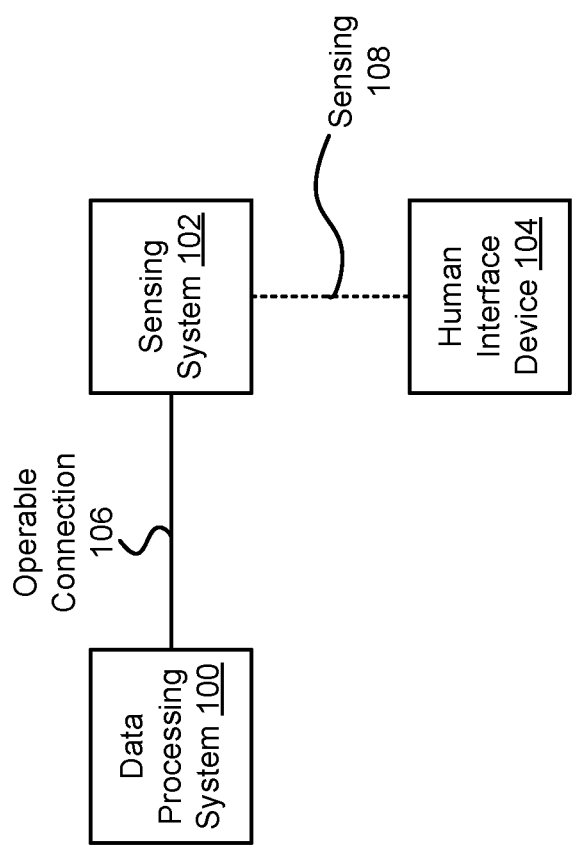
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic fields detectable by a sensing system. The sensing system may sense the magnetic fields and obtain information reflecting changes in the position and/or orientation of a magnet of the human interface device that generates the magnetic fields. Thus, information reflecting actuations of the human interface device by the user may be encoded in the magnetic fields and may be sensed.

The obtain information may then be used to identify, for example, user input provided by the user. For example, the information regarding changes in the position and/or orientation of the magnet may be translated into user input. The user input may then be used to drive computer implemented services.

For example, the user input may be provided by the user to activate certain functionalities, change functionalities, terminate functionalities, and/or invoke desired activities by a data processing system.

By using a magnet and mechanical linkage to the magnet, the human interface device may not need to be powered, may include fewer components thereby reducing the likelihood of component failures, may be made lighter/smaller thereby reducing loads placed on user of user input devices, etc.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining user input.

In an embodiment, a human interface device is provided. The human interface device may include a body movable though application of force by a user; a magnet positioned with the body, the magnet emanating a magnetic field distribution that extends into an ambient environment proximate to the human interface device; a button mechanically coupled to the magnet via a first mechanical linkage, the first mechanical linkage being adapted to rotate the magnet in a first plane when the button is actuated by the user; and a scroll control mechanically coupled to the magnet via second mechanical linkage, the second mechanical linkage being adapted to rotate the magnet in a second plane when the scroll control is actuated by the user.

The human interface device may be unpowered.

The first plane and the second plane may not be coplanar or parallel. The first plane may be substantially perpendicular (e.g., within 5° of being perpendicular) to the second plane. The first plane may be substantially orthogonal (e.g., within 5° of being orthogonal) to the second plane.

The first mechanical linkage may include a support element extending from the button to the body, the support element suspending the button above the body by a first distance, and the support element flexing when the button is actuated by the user to rotate the magnet in the first plane.

The second mechanical linkage may include a cradle that houses the magnet; and a suspension element extending from the button toward the body by a second distance that is smaller than the first distance and positioned to suspend the cradle between the button and body.

The scroll control may be directly attached to the cradle, and the suspension element flexing when the scroll control is actuated by the user to rotate the magnet in the second plane.

The human interface device may also include a second button mechanically coupled to the magnet via the second mechanical linkage, the first mechanical linkage rotating the magnet in a first direction when the button is actuated and a second direction when the second button is actuated. The first mechanical linkage may be further adapted to return the magnet to a predetermined position while neither of the button and the second button are actuated.

The second mechanical linkage may be further adapted to return the magnet to the predetermined position while the scroll control is not actuated.

The button, the scroll control, and the second button may be positioned on a top surface of the human interface device.

The suspension element may be adapted to flex to a first degree, the support element is adapted to flex to a second degree, and the first degree is larger than the second degree.

The human interface device may further include an actuation element extending from the button toward the body; and a sensory feedback element positioned between the body and the actuation element, the actuation element adapted to: generate an auditory signal and/or haptic when suspension element flexes to the first degree, and limit an extent of rotation of the magnet in the first plane.

The extent of rotation of the magnet in the second plane may be limited by an extent to which the scroll control is exposed above the button and the second button.

In an embodiment, a user input system is provided. The user input system may include a human interface device as discussed above and a sensing system adapted to measure the magnetic field emanating from the magnet.

In an embodiment, a data processing system is provided. The data processing system may include a user input system as discussed above, a processor, and a memory coupled to the processor to store instructions, which when executed by the processor, cause the processor to perform operations for obtaining user input using data obtained from the sensing system.

In an embodiment, a non-transitory media is provided. The non-transitory media may include instructions that when executed by a processor operations for obtaining user input using data obtained from the sensing system, as discussed above.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and provide the signals and/or data to data processing system 100. A user may physically interact with human interface device 104, thereby allowing the signals and/or data provided by sensing system 102 to include information regarding the physical actions of the user.

For example, if a user moves human interface device 104, sensing system 102 may track the change in position and/or motion of human interface device 104 and provide signals and/or data reflecting the changes in position and/or motion. Similarly, if a user actuates an actuatable portion (e.g., buttons) of human interface device, sensing system 102 may track the actuation of the actuatable portion and provide signals and/or data reflecting the actuation.

To track human interface device 104, sensing system 102 may include one or more sensors that sense a magnetic field emanating from human interface device 104. The sensors may use the sensed magnetic field to track a location (absolute or relative) and orientation (absolute or relative) of a magnet embedded in human interface device 104. The sensors may generate the signals and/or data provided by sensing system 102 to data processing system 100. The sensors may sense the magnitude and/or direction of the magnetic field that passes proximate to each sensor. By knowing the relative placements of the sensors with respect to one another, the position and/or orientation of the magnet may be known (e.g., the magnetic field may be treated as emanating from a magnet with known dimensions and/or strength).

Sensing system 102 may also include, for example, analog to digital converters, digital signal processing devices or other signal processing devices, and/or other devices for generating the signals and/or data based on information obtained via the sensors.

Human interface device 104 may be implemented with a physical device that a user may actuate in one or more ways. For example, human interface device 104 may (i) be moveable, (ii) may include one or more buttons, (iii) may include one or more scroll controls, and/or (iv) may include other actuatable elements. Actuating human interface device 104 may change the orientation and/or position of the magnet with respect to the sensors of sensing system 102.

Figure 2A:
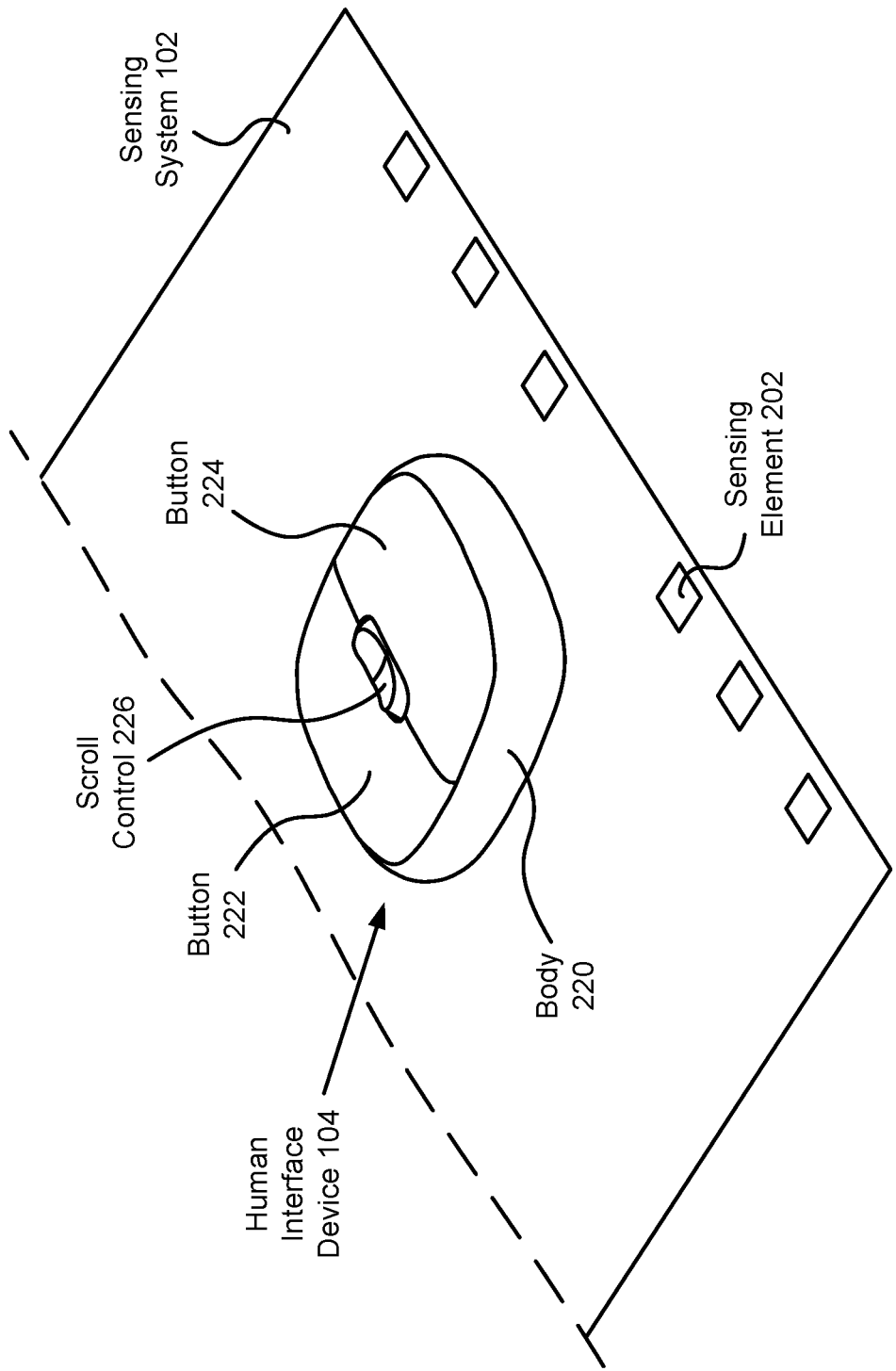
FIG. 2A shows a diagram illustrating a human interface device and a sensing system in accordance with an embodiment.
Figure 2B:
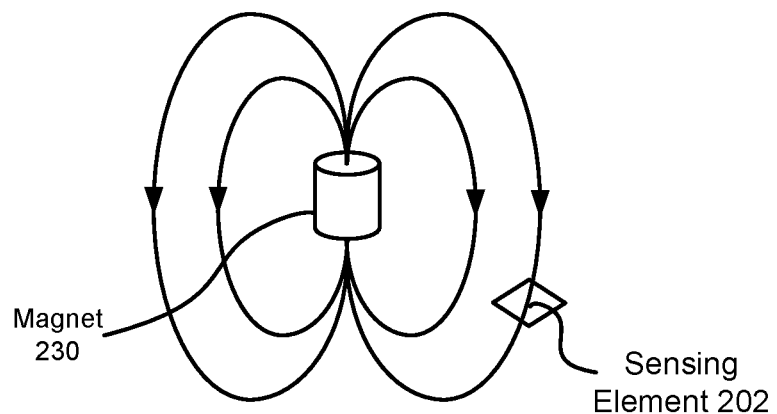
FIGS. 2B-2C show diagrams illustrating field sensing in accordance with an embodiment.
Figure 2C:
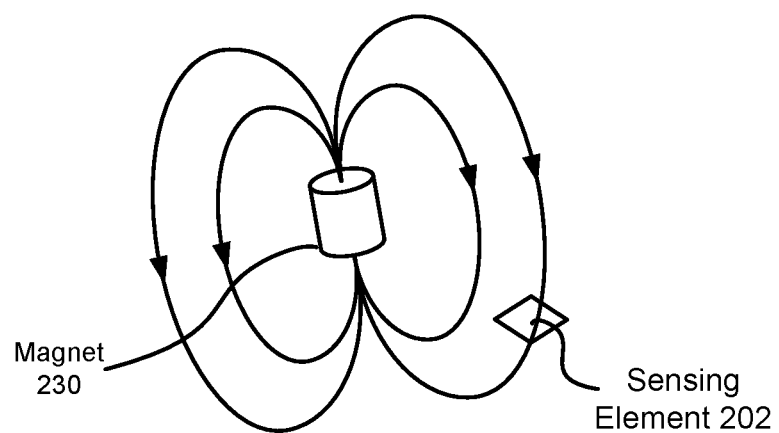

For example, when human interface device 104 is move away from sensing system 102, the strength of the magnetic field emanating from the magnet as sensed by sensors of sensing system 102 may decrease. Similarly, when buttons or other actuatable elements of human interface device 104 are actuated, the magnet may be rotated (e.g., in one or more planes) thereby changing the direction of the magnetic field sensed by sensors of sensing system 102. Refer to FIGS. 2A-2C for additional details regarding sensing of human interface device 104.

Human interface device 104 may be a passive device. For example, human interface device 104 may not consume power, include batteries or sensors, etc. Consequently, human interface device 104 may be of smaller size, lower weight, and/or may provide other advantages when compared to active devices such as a computer mouse. Refer to FIGS. 2C-2O for additional details regarding human interface device 104.

Data processing system 100 may perform a lookup or other type of operation to translate the signals and/or data from sensing system 102 into user input. Once obtained, the user input may be used to drive downstream processes.

Figure 3:
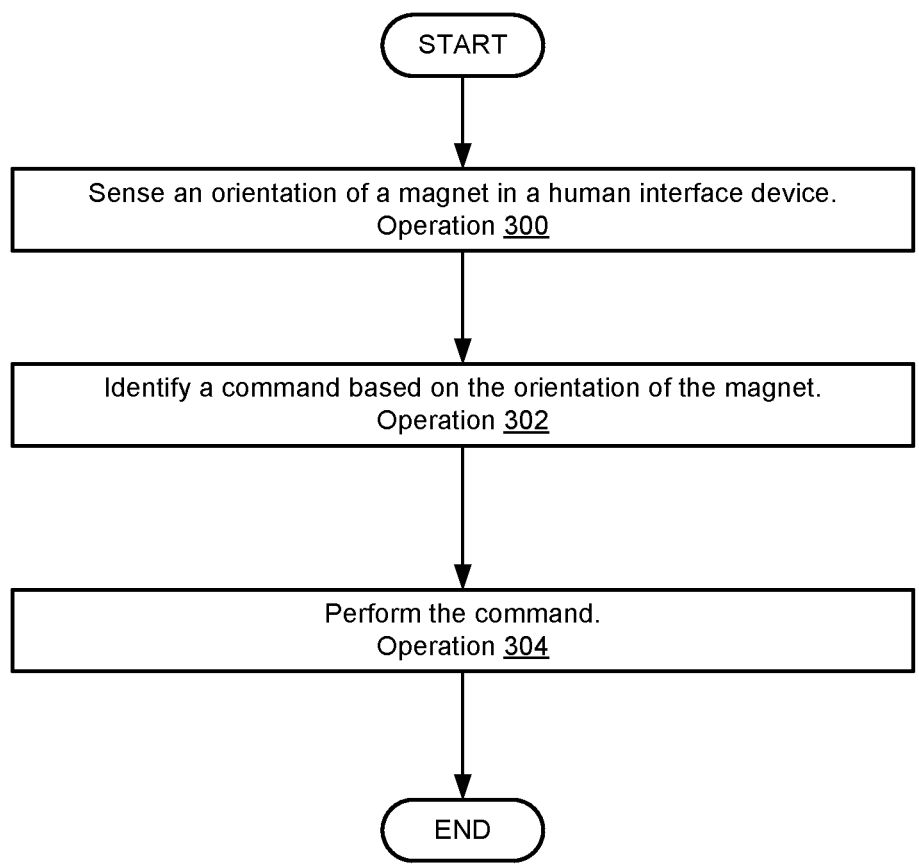
FIG. 3 shows a flow diagram illustrating a method of obtaining user input and providing computer implemented services in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. However, in some embodiment, human interface device 104 may not be operably connected to other device (e.g., may be a passive device), but may be sensed by sensing system 102 via sensing 108. For example, during sensing 108, a static magnetic field emanating from human interface device 104 may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2C.

Turning to FIG. 2A, an isometric diagram of human interface device 104 and sensing system 102 in accordance with an embodiment is shown.

To obtain user input, human interface device 104 may include body 220, and a number of actuatable elements (e.g., 222-226). Body 220 may be implemented with a structure upon which other elements may be affixed. For example, body 220 may be implemented with a plastic injection molded component or other structure. Body 220 may have a flat bottom that may allow human interface device 104 to slide along a surface on which it is positioned. Thus, one form of actuation of human interface device 104 may be for a person to grip body 220 and apply for to it to move it along the surface (thereby repositioning it with respect to sensing elements of sensing system 102, discussed below).

To obtain user input (in addition to via repositioning), the actuatable elements may include buttons 224-226 and a scroll control 226. Generally, the actuatable element may be positioned on a top surface of human interface device 104, but may be positioned elsewhere (e.g., on side surfaces). The actuatable elements may be actuatable by a person through application of force. Refer to FIGS. 2H-2I, 2M-2O for additional details regarding actuation of the actuatable elements by application of force.

Buttons 222-224 may be implemented, for example, with surfaces that may be actuated through application of pressure downward. Application of the pressure may cause the button to move towards body 220. A return mechanism may return the buttons to a resting position while force is not applied to it.

Likewise, scroll control 226 may be implemented, for example, with a structural protrusion that may be actuated through application of pressure downward. In contrast to buttons 222-224, scroll control 226 may be actuated differently through application of pressure to different portions of scroll control 226. A return mechanism may return the scroll control 226 to a resting position while force is not applied to it.

Figure 2D:
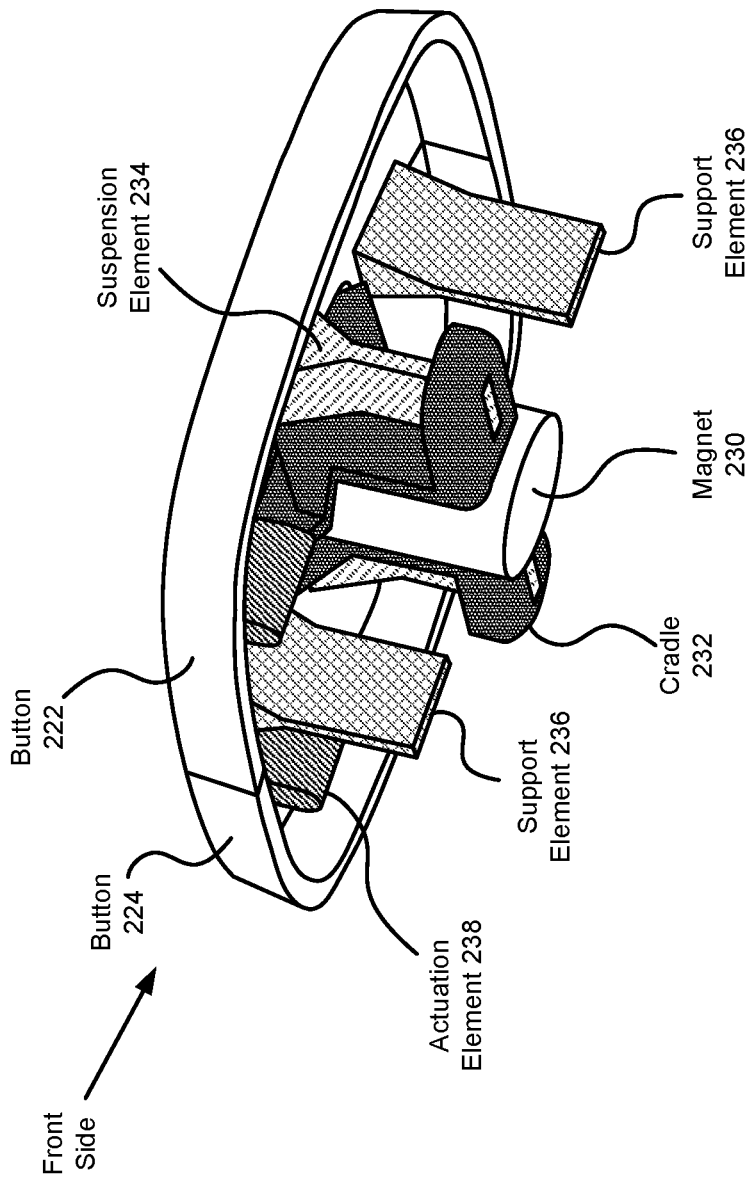
FIG. 2D shows a diagram of a portion of a human interface device in accordance with an embodiment.

Application of force to body 220 may reposition human interface device 104 with respect to sensing elements of sensing system 102. In contrast, application of force to the actuation elements may change an orientation of a magnet embedded inside of body 220 with respect to the sensing elements. For example, application of force to the respective buttons 222-224 may rotate the magnet forwards or backwards, respectively, in a first plane. Likewise, application of force to scroll control 226 may rotate the magnet forwards or backwards in a second plan, depending on where force is applied to scroll control 226. The rotation and/or repositioning of the magnet may modify the magnetic field applied to the sensing elements of sensing system 102. Refer to FIGS. 2B-2C for additional details regarding the magnetic field emanating from human interface device 104. Refer to FIG. 2D for additional details regarding the magnet embedded in human interface device 104.

Like body 220, the actuatable elements may generally be formed from plastic injection molded or other types of plastic and/or molded parts.

To obtain user input, sensing system 102 may include any number of sensing elements (e.g., 202). The sensing elements may be sensors that monitor a magnitude and direction of a magnetic field, and generate signals or data to reflect these quantities. While not shown, sensing system 102 may include a signal processing chain (e.g., any number of signal conditioning and processing devices) that may condition and process the signals generated by the sensing elements to obtain information regarding the location and/or orientation of the magnet embedded in human interface device 104.

In FIG. 2A, sensing system 102 is illustrated in the form of a pad or other structure upon which human interface device 104 may be positioned (the dashed line to the top left of the drawing indicates that the structure may continue on beyond that which is explicitly illustrated). However, sensing system 102 may be implemented with other types of structures.

Additionally, while the sensing elements are illustrated with example positions, it will be appreciated that the sensing elements may be positioned differently without departing from embodiments disclosed herein.

Turning to FIGS. 2B-2C, diagrams illustrating a magnet and sensing element 202 in accordance with an embodiment are shown. As noted above, human interface device 104 may include magnet 230. Magnet 230 may project a magnetic field. In these figures, the magnetic field is illustrated using lines with arrows superimposed over the midpoints of the lines. The direction of the arrow indicates and orientation of the field.

As seen in FIG. 2B, when magnet 230 is proximate (e.g., within a predetermined distance range, which may vary depending on the strength of magnet 230 and sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of magnet 230, the magnitude and orientation of the magnetic field at the location of sensing element 202 may be usable to identify, in part, the location and orientation of magnet 230.

For example, when magnet 230 is rotated as shown in FIG. 2C from the orientation as shown in FIG. 2B, the direction and/or magnitude of the magnetic field at the location of sensing element 202 may change. By identify the magnitude and orientation of the magnetic field at a number of locations (e.g., corresponding to different sensing elements), the position and orientation of magnet 230 may be identified.

To utilize the location and orientation of the magnet embedded in human interface device 104 to obtain user input, magnet 230 may be mechanically coupled to the actuatable elements and body 220. Turning to FIGS. 2D-2O, diagram illustrating mechanical coupling between magnet 230 and various portions of human interface device 104 in accordance with an embodiment are shown.

In FIG. 2D, a diagram of a portion of human interface device 104 in accordance with an embodiment is shown. The view may be looking upwards towards an underside of buttons 222-224 shown in FIG. 2A.

To mechanically couple magnet 230 to buttons 222-224, scroll control 226, and body 220, magnet 230, human interface device 104 may include two mechanical linkages.

A first mechanical linkage may connect magnet 230 to buttons 222-224 and scroll control 226 (not shown in FIG. 2D) and a second mechanical linkage may connect the buttons 222-224 to body 220 (not shown in FIG. 2D).

The first mechanical linkage may include cradle 232 and suspension elements (e.g., 234). Cradle 232 may be implemented with a structure in which magnet 230 is positioned. For example, the structure may include two posts on opposite sides of magnet 230. Magnet 230 may be fixedly attached (e.g., via adhesive or other means) to the posts. Each of the posts may be attached to a corresponding suspension element and the scroll control. For example, a top of each of the posts may be attached to scroll control 226, and a bottom of each of the posts may be attached to a different suspension element.

Suspension element 234 may be implemented with a post, bar, or other mechanical structure. The structure may extend from a bottom surface of one of the buttons by a first distance (e.g., that is less than a second distance over which support element 236 extends, discussed below). The extended end of the structure may attach to cradle 232.

Suspension element 234 may suspend cradle 232, magnet 230, and scroll control 226 with respect to buttons 222-224 and body 220. Suspension element 234 may also facilitate rotation of magnet 230 in a first plane. For example, when force is applied to scroll control 226, the force may be transmitted to the suspension elements attaching cradle 232 to the buttons. The force may cause the suspension elements to flex thereby allowing for rotation of cradle 232 and magnet 230 (attached to cradle 232). Suspension element 234 may be formed with an elastic material, and may include specific mechanical features (e.g., thickness, relief elements, etc.) to facilitate the flex and automatic return to a neutral position (as illustrated in FIG. 2D) of suspension element 234. Consequently, when force is no longer applied to scroll control 226, magnet 230 may be automatically returned to the neutral position (at least with respect to rotation in the first plane).

The second mechanical linkage may include support element 236. Support element 236 may be implemented with a post, bar, or other mechanical structure. The structure may extend from a bottom surface of one or both of buttons 222-224 by a second distance that is greater than the first distance. As will be discussed in greater detail below, the extended end of support element 236 may be fixed to body 220 thereby suspending buttons 222-224, cradle 232, magnet 230, suspension element 234, and scroll control 226 with respect to body 220.

Support element 236 may also facilitate rotation of magnet 230 in a second plane. For example, when force is applied to one of buttons 222-224, the force may be transmitted to the support elements. The force may cause the support elements to flex thereby allowing for rotation of cradle 232 and magnet 230 (attached to cradle 232) in the second plane. The first plane and the second plane may be substantially (e.g., withing a few degrees such as 3°) perpendicular or orthogonal to one another.

Support element 236 may be formed with an elastic material, and may include specific mechanical features (e.g., thickness, relief elements, etc.) to facilitate the flex and automatic return to the neutral position (as illustrated in FIG. 2D) of support element 236. Consequently, when force is no longer applied to buttons 222-224, magnet 230 may be automatically returned to the neutral position (at least with respect to rotation in the second plane).

To limit the degree of rotation in the first plane and provide a user with sensory feedback for buttons 222-224, actuation elements (e.g., 238) may be positioned with buttons 222-224. The actuation elements may be implemented with a post, bar, or other mechanical structure. The structure may extend from a bottom surface of one of buttons 222-224 by a thirds distance that is less than the first distance and the second. As will be discussed in greater detail below, the actuation elements may be positioned with other structures to limit the degree of flex of the support elements and to generate auditory signals (e.g., clicking noises) for users of human interface device 104. A haptic feedback may also be generated. For example, the haptic feedback may be sensed by an appendage used by the user to actuate it.

In FIG. 2D, the structures positioned with buttons 222-224 have been illustrated using varying infill patterns. These infill patterns are maintained when these same structures are illustrated in FIGS. 2E-2O.

Figure 2E:
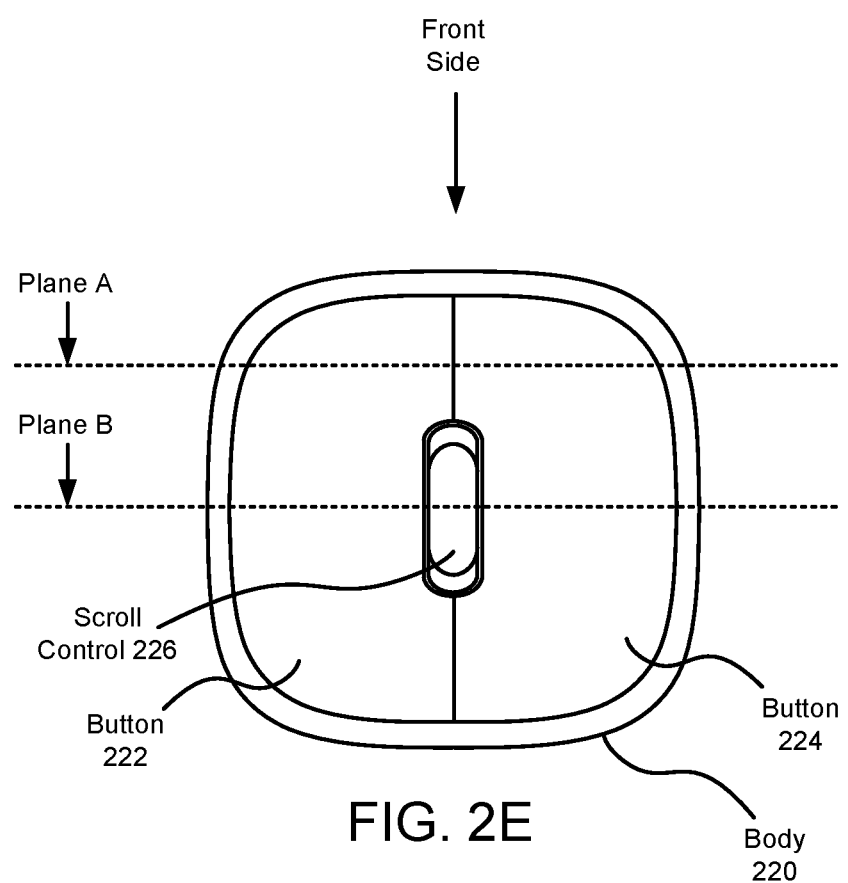
FIG. 2E shows a first top view diagram of a human interface device in accordance with an embodiment.
Figure 2F:
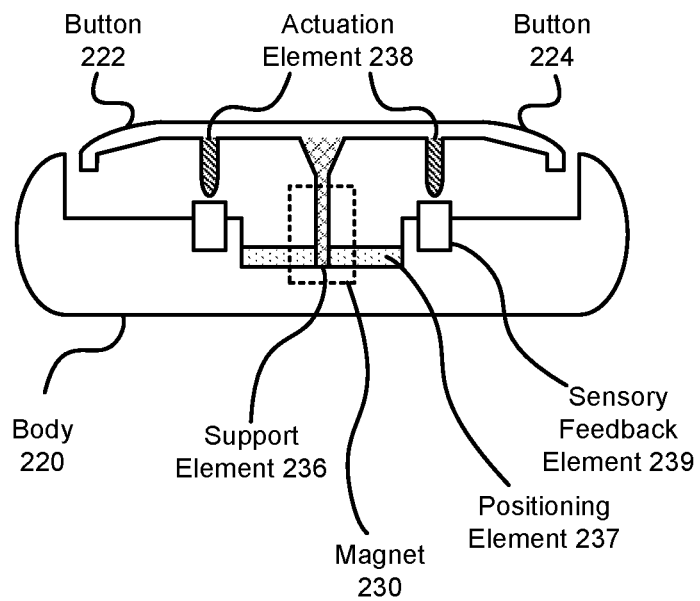
FIGS. 2F-2I show cross section diagrams of a human interface device in accordance with an embodiment.
Figure 2G:
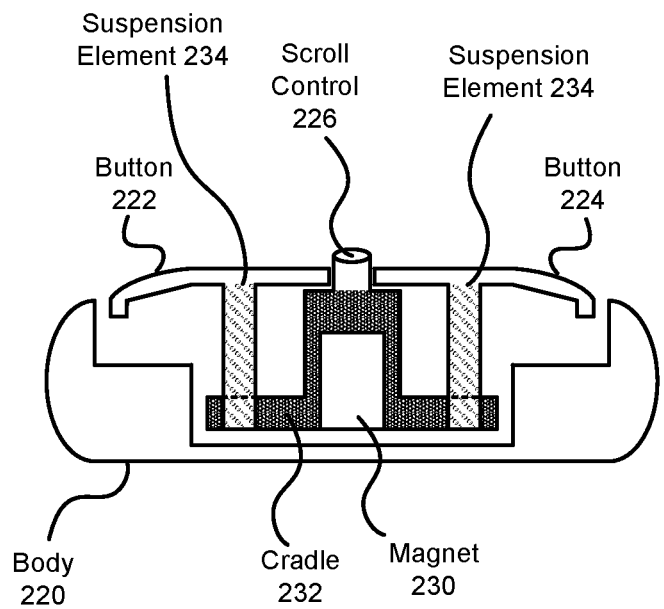
Figure 2H:
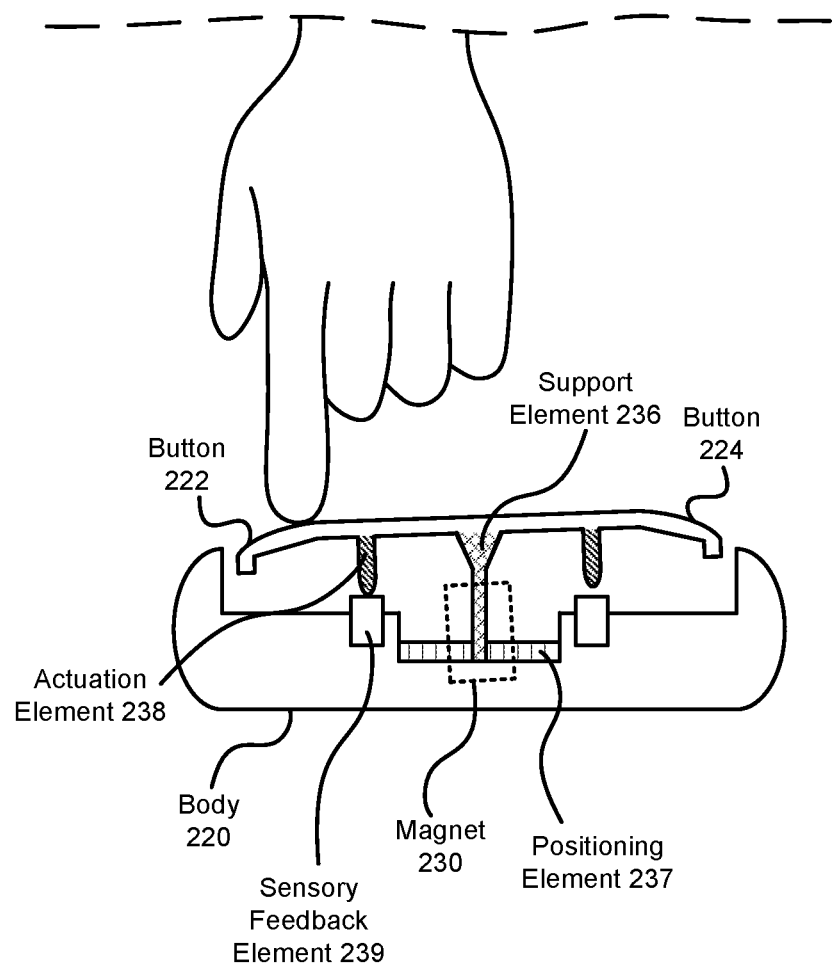
Figure 2I:
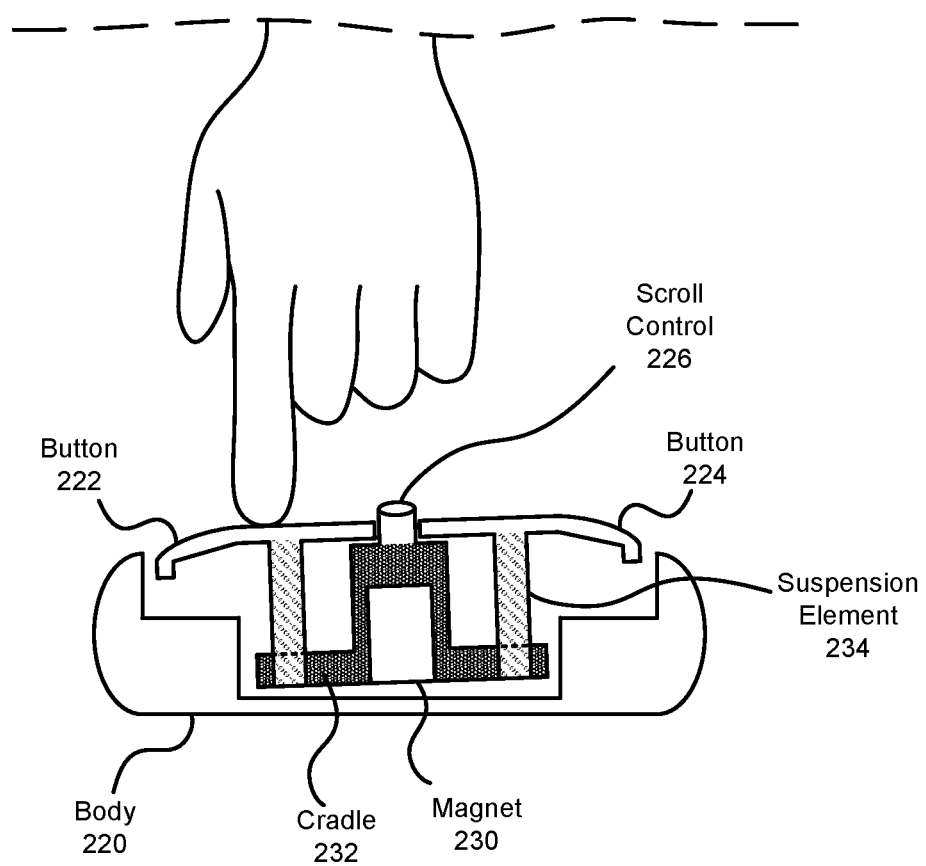
Figure 2J:
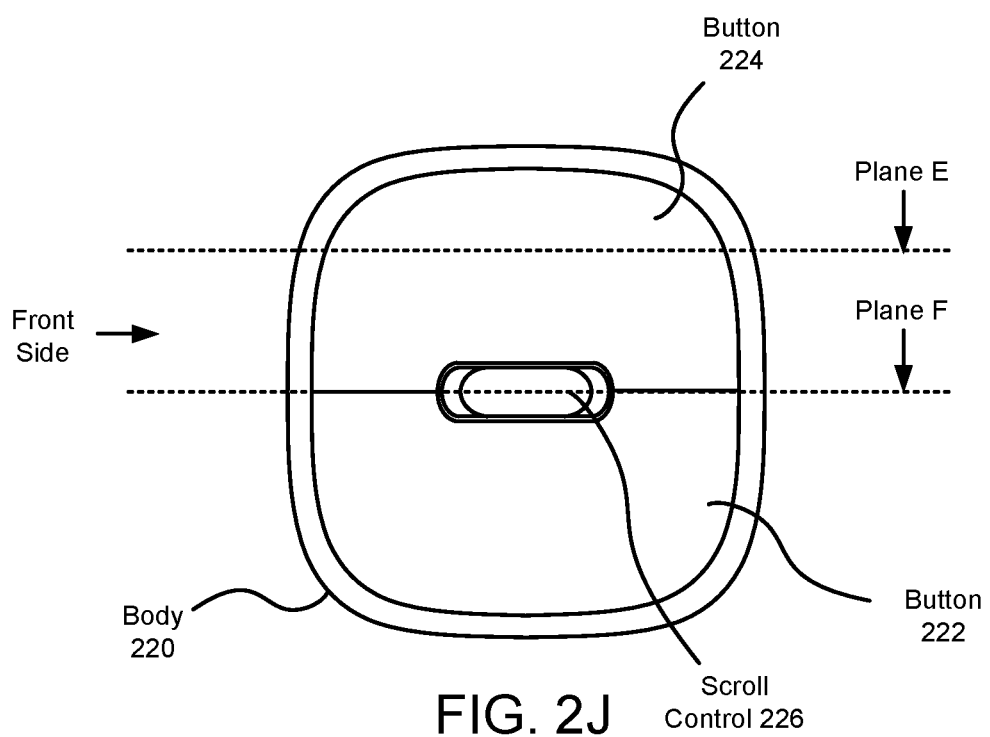
FIG. 2J shows a second top view diagram of a human interface device in accordance with an embodiment.
Figure 2K:
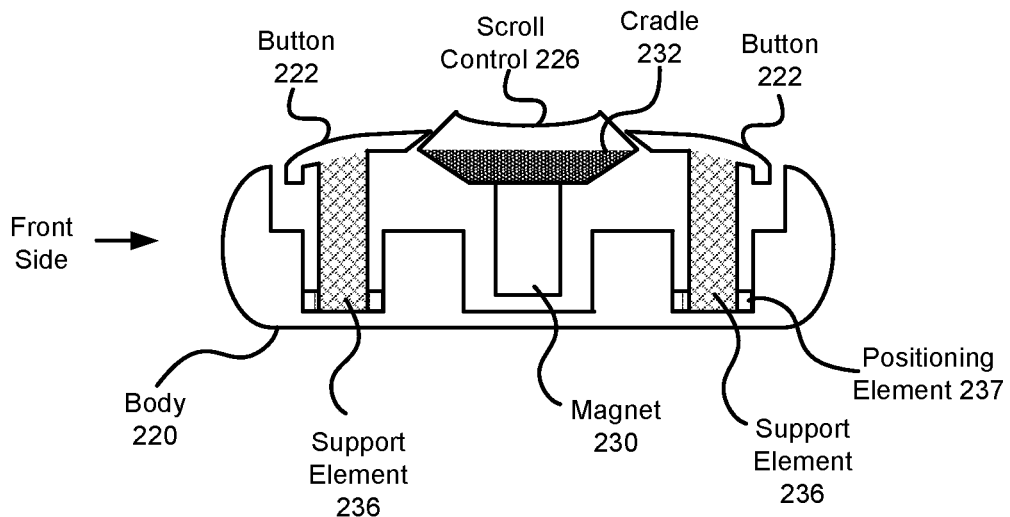
FIGS. 2K-2O show cross section diagrams of a human interface device in accordance with an embodiment.

To further clarify the operation of human interface device, cross section views of human interface device 104 in accordance with an embodiment are shown in FIGS. 2F-2I and 2K-2O. Top view of human interface device 104 in accordance with an embodiment are shown in FIGS. 2E and 2K to illustrate the locations of the planes in which the cross views are taken.

Turning to FIG. 2E, a first top view diagram of human interface device 104 in accordance with an embodiment is shown. As seen in FIG. 2E, the top of human interface device 104 may be substantially covered with buttons 222-224 and scroll control 226. To actuate buttons 222-224, force may be applied downward into the page on any portion of the respective button. The direction of rotation of magnet 230 may correspond to the respective buttons (e.g., opposite directions to one another)

To actuate scroll control 226, downward force may be applied to scroll control 226. However, the location to which the force is applied may dictate the direction of the rotation of the magnet. With respect to FIG. 2E, if force is applied to the top half of scroll control 226, then magnet 230 may rotate in a first direction. In contrast, if force is applied to the bottom half of scroll control 226, then magnet 230 may rotate in the second direction.

In FIG. 2E, two planes (i.e., Plane A and Plane B) are illustrated using respective dashed lines. The diagrams shown in FIGS. 2F and 2H may correspond to Plane A, while the diagrams shown in FIGS. 2G and 2I may correspond to Plane B.

Turning to FIG. 2F, a first cross section diagram of human interface device 104 in accordance with an embodiment is shown. In FIG. 2F, magnet 230 is not part of the cross section. However, for illustrative purposes, the outline of magnet 230 is superimposed.

As seen in FIG. 2F, when positioned with body 220, support element 236 may suspend buttons 222-224 and actuation elements (e.g., 238) above body 220. Sensory feedback elements (e.g., 239) may be positioned between body 220 and corresponding actuation elements. As will be illustrated in FIG. 2H, actuation of either button may cause a corresponding actuation element to contact one of the sensory feedback elements. The position of the sensory feedback elements may limit the degree of rotation of magnet 230 and cause sensory feedback element 239 to generate an auditory signal (e.g., a sound) when an actuation element contact it.

Sensory feedback element 239 may be implemented using a structure such as a noise making component that generates a sound when pressure is applied to one of its surfaces. The auditory signal may alert a user of human interface device 104 that sufficient force has been applied to a button for user input to be discerned by a data processing system.

To position support element 236, a positioning element 237 may be positioned with one end of support element 236 and body 220. Positioning element 237 may be implemented, for example, with a portion of plastic or other material in which the end of support element 236 may be positioned.

Turning to FIG. 2G, a second cross section diagram of human interface device 104 in accordance with an embodiment is shown. As seen in FIG. 2G, while supported by support element 236, suspension elements (e.g., 234) may suspend cradle 232, magnet 230, and scroll control 226 above body 220. Consequently, when force is applied to either button (e.g., 222, 224), cradle 232 and magnet 230 may rotate (clockwise or counterclockwise, depending on which button is pressed).

Turning to FIG. 2H, a third cross section diagram of human interface device 104 in accordance with an embodiment is shown. The diagram shown in FIG. 2H may be similar to that shown in FIG. 2F. As seen in FIG. 2H, when force is applied to button 222, support element 236 may flex thereby allowing magnet 230 to rotate counterclockwise in this example. The direction of rotation may be clockwise while button 224 is pressed.

However, the degree of rotation may be limited by sensory feedback element 239 and actuation element 238. For example, the degree of rotation may be limited to 6°. When the limit is reached, sensory feedback element 239 may both prevent additional limitation and may provide an auditory signal when the limit is reached. Sensory feedback element 239 may also provide a second auditory signal when actuation element 238 rotates away from sensory feedback element 239 once pressure on button 222 is released. In this manner two auditory signals may be provided to a user to guide use of human interface device 104.

Turning to FIG. 2I, a fourth cross section diagram of human interface device 104 in accordance with an embodiment is shown. The diagram shown in FIG. 2I may be similar to that shown in FIG. 2G. As seen in FIG. 2G, when force is applied to button 222, cradle 232 and magnet 230 may freely rotate without impinging on body 220 or other structures. However, as noted with respect to FIG. 2I, the degree of rotation may be limited by sensory feedback element 239 and actuation element 238.

Turning to FIG. 2J, a second top view diagram of human interface device 104 in accordance with an embodiment is shown. With respect to FIG. 2E, human interface device 104 has been rotate 90° counterclockwise in FIG. 2J. In FIG. 2J, two planes (i.e., Plane E and Plane F) are illustrated using respective dashed lines. The diagrams shown in FIGS. 2K, 2M-2N may correspond to Plane F, while the diagrams shown in FIGS. 2L and 2O may correspond to Plane E. Plane E may be aligned with one instance of actuation element 238 while Plane F may be aligned with magnet 230. While not in Plane E, the outline of magnet 230 has been added to FIGS. 2L and 2O using a dashed line for illustrative purposes.

Turning to FIG. 2K, a fifth cross section diagram of human interface device 104 in accordance with an embodiment is shown. As seen in FIG. 2K, when positioned with body 220, support element 236 may suspend buttons 222-224, magnet 230, cradle 232, and scroll control 226 above body 220. For example, scroll control 226 may be positioned on cradle 232, and may extend above buttons 222-224 thereby allowing a user to apply pressure to it. Cradle 232 may be attached to the buttons via suspension elements (e.g., 234), which may be attached to respective buttons.

By being suspended, magnet 230 may be free to rotate clockwise or counterclockwise depending on the portion of scroll control 226 to which force is applied.

Figure 2L:
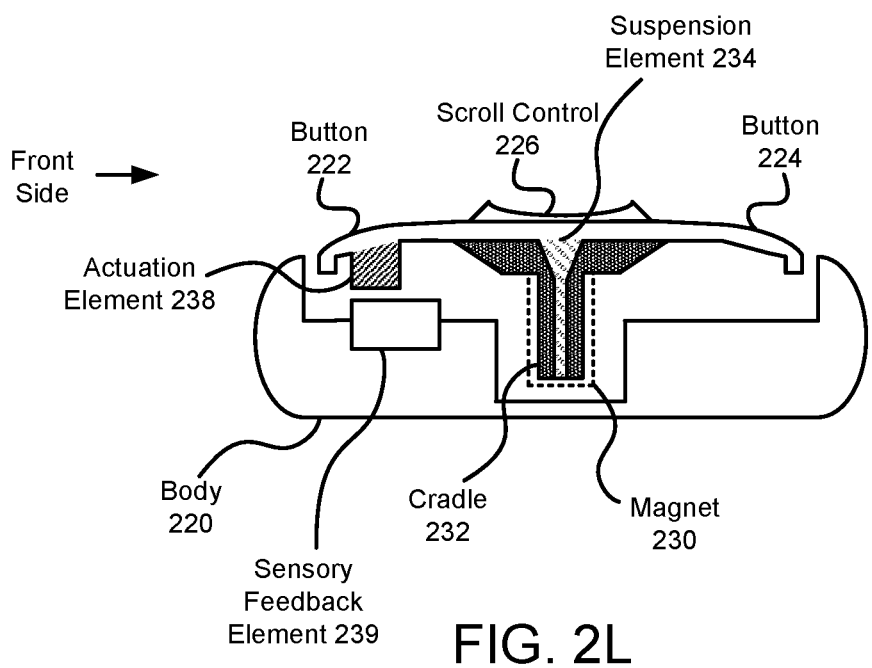

Turning to FIG. 2L, a sixth cross section diagram of human interface device 104 in accordance with an embodiment is shown. As seen in FIG. 2L, cradle 232 may be attached to the buttons via suspension elements (e.g., 234), which may be attached to respective buttons. Consequently, magnet 230 may be suspended via this mechanical linkage.

Figure 2M:
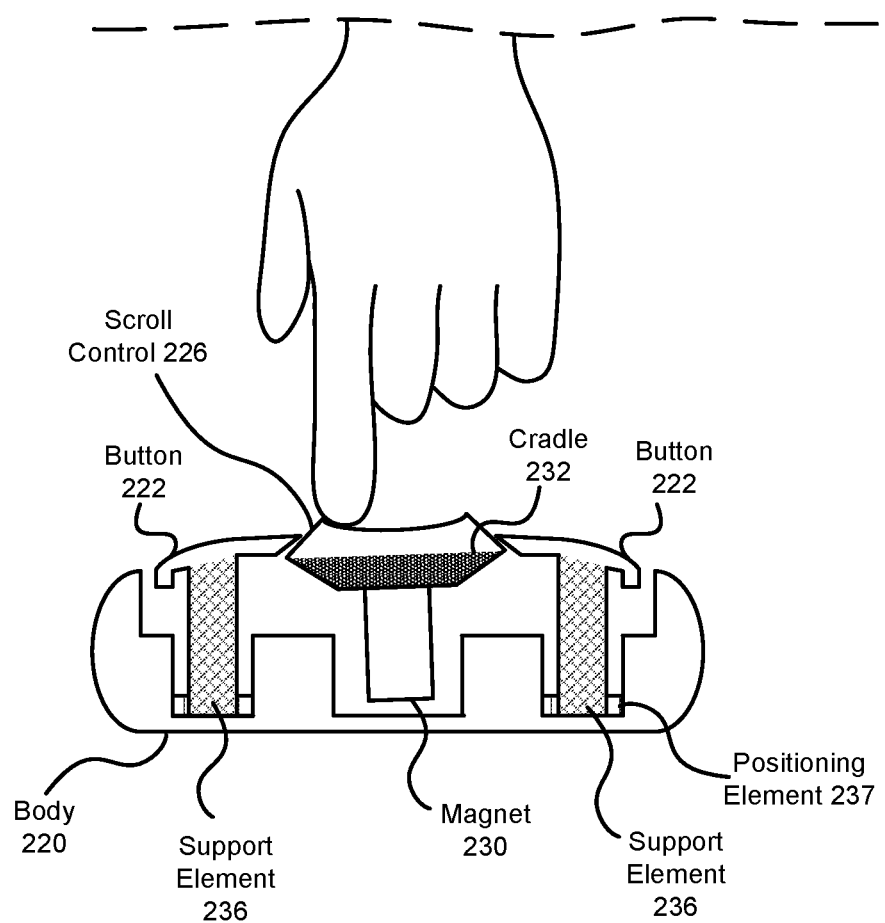

Turning to FIG. 2M, a seventh cross section diagram of human interface device 104 in accordance with an embodiment is shown. The diagram shown in FIG. 2M may be similar to that shown in FIG. 2K. As seen in FIG. 2M, when force is applied to a front portion of scroll control 226, suspension element 234 (shown in FIG. 2O) may flex thereby allowing magnet 230 to rotate counterclockwise in this example. The direction of rotation may be clockwise if force is applied to the back side of scroll control 226.

The degree of rotation of magnet 230 may be limited by the surface of the buttons that may form the rest of the top surface of human interface device 104. However, the degree of rotation in this plane may be greater than the degree of rotation in the plane shown in FIG. 2G.

Figure 2N:
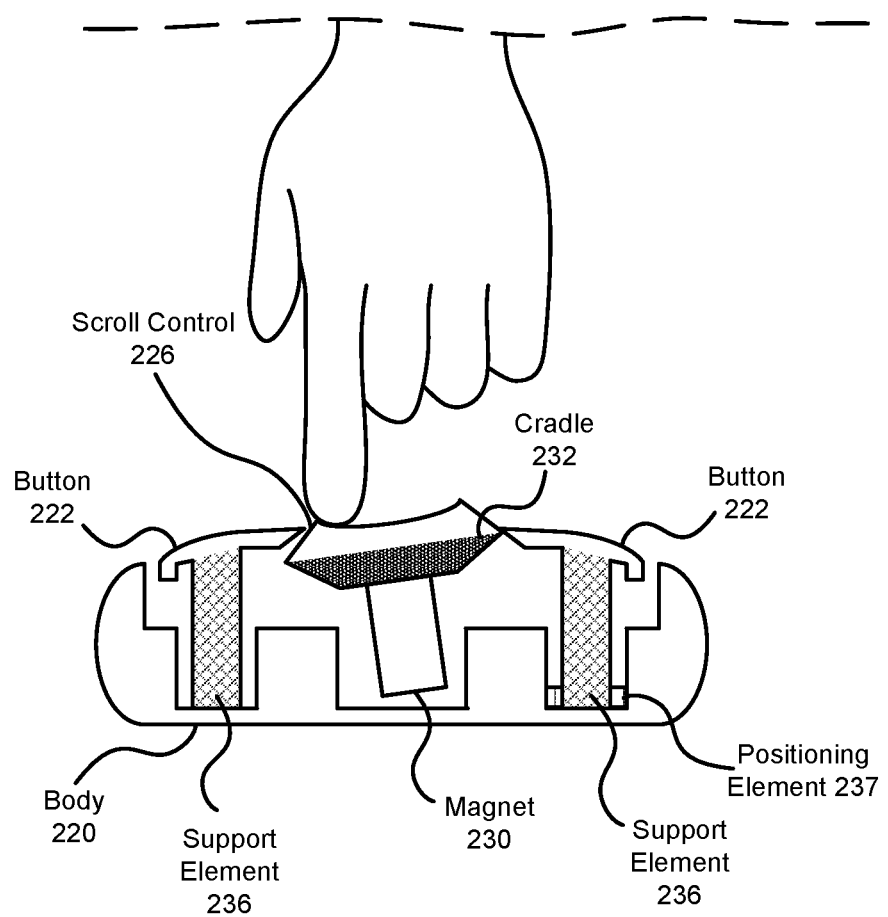

For example, turning to FIG. 2N, an eighth cross section diagram of human interface device 104 in accordance with an embodiment is shown. As seen in FIG. 2N, the degree of rotation of magnet 230 may be greater in this plane than that shown in FIG. 2G. For example, the degree of rotation may be up to 10 degrees. As will be discussed with respect to FIG. 3, the degree of rotation may be used to identify different types of user input that a user is attempting to convey through actuation of scroll control 226.

Figure 2O:
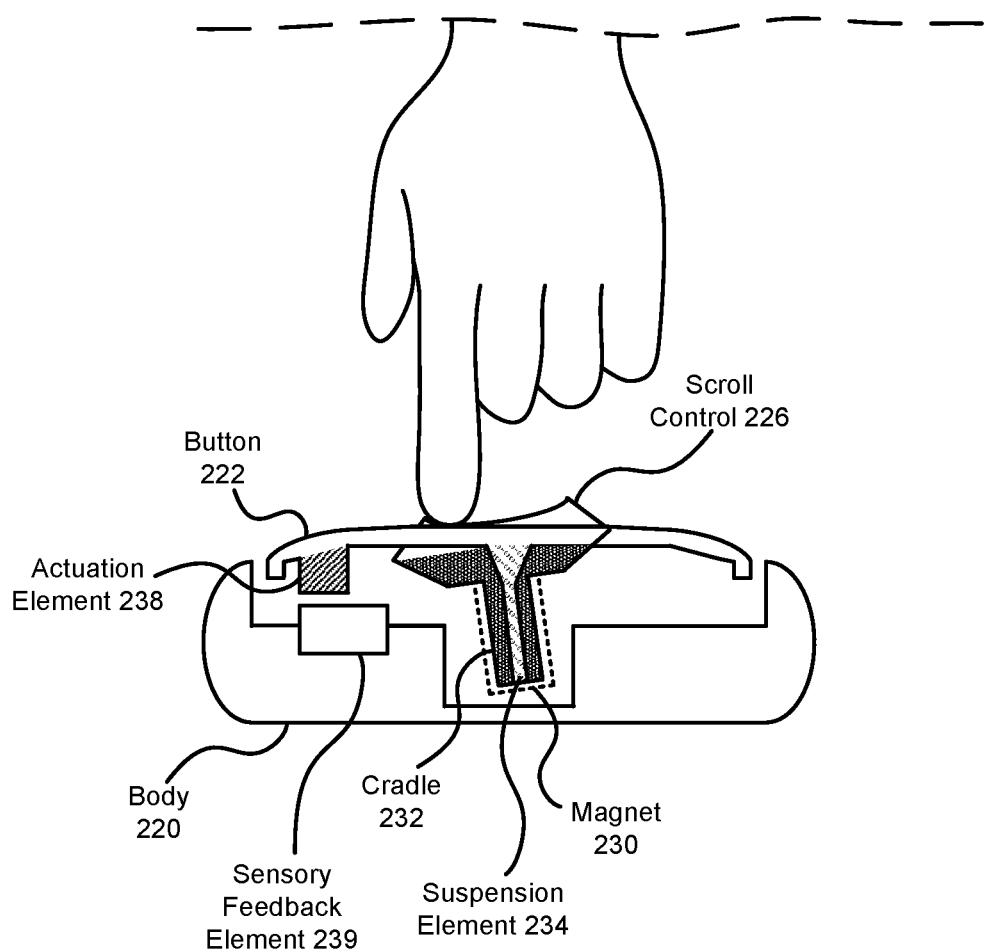

Additionally, as seen in FIG. 2N, magnet 230 is suspended through suspension element 234. Turning to FIG. 2O, a nineth cross section diagram of human interface device 104 in accordance with an embodiment is shown. As seen in FIG. 2O, when force is applied to scroll control 226, suspension element 234 may flex thereby allowing cradle 232 and magnet 230 attached to it to rotate. As noted above, the degree of rotation in this dimension may only be limited by the surface of the buttons (e.g., 222, 224). Thus, for example, magnet 230 may rotate up to, for example, to 10° in this plane (in contrast to the rotation of 6° in the other plane).

It will be appreciated that the extent of the rotation in each of the planes may vary without departing from embodiments disclosed herein.

While FIGS. 2A-2O have been illustrated as including specific numbers and types of components, it will be appreciated that any of the devices depicted therein may fewer, additional, and/or different components without departing from embodiments disclosed herein.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, an orientation and/or position of a magnet in a human interface device is sensed. The orientation and/or positioned may be sensed by (i) obtaining measurements of a magnetic field emanating from the magnet, and (ii) computing the position and/or orientation based on the measurements.

At operation 302, a command is identified based on the orientation and/or position of the magnet. The command may be identified, for example, by comparing the position and/or orientation to a past position and/or orientation.

The command may be identified by (i) identifying an orientation of the magnet in a first plane, (ii) identifying an orientation of the magnet in the second plane, and (iii) identifying the location of the magnet with respect to a sensing system.

The orientation of the magnet in the first plane may be used to a perform a lookup based on a degree and direction of rotation of the magnet in the first plane. For example, if positively rotated by an amount exceeding a threshold, then the command may be identified as a left click of a pointing device. In another example, if negatively rotated by the amount exceeding the threshold, then the command may be identified as a right click of the pointing device.

The orientation of the magnet in the second plane may be used to a perform a lookup based on a degree and direction of rotation of the magnet in the second plane. For example, if positively rotated by an amount exceeding a threshold, then the command may be identified as scrolling in a first direction and a rate of the scrolling may be identified (e.g., scaled) based on a degree of excess of the rotation beyond the threshold. In another example, if negatively rotated by an amount exceeding the threshold, then the command may be identified as scrolling in a second direction (opposite of the first, or another direction) and a rate of the scrolling may be identified (e.g., scaled) based on a degree of excess of the rotation beyond the threshold.

The thresholds of rotation for the two planes may be similar or different. For example, the threshold for the second plane may be smaller than the first (e.g., thereby providing for a larger scaling range of the rate of scrolling), or may be larger (e.g., thereby limiting the scaling range of the rate of scrolling).

The command may also be identified by, for example, using the position of the human interface device to identify a change in focus of the user (e.g., a mouse location on a display). The combination of the focus of the user and the user input (e.g., based on the user clicking a button, depressing a scroll wheel, etc.) may then be used to identify, for example, a function of an application or other type of functionality to be initiated or otherwise performed.

At operation 304, the command is performed. The command may be performed, for example, by an operating system passing through or otherwise providing information regarding the command to an application or other consumer of the user input. The consumer may then take action based on the command.

For example, a data processing system may host an operating system, drivers, and/or other executing entities that may take responsibility for translating signals/data from a sensing system into commands or other types of user input.

The method may end following operation 304.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits.

Figure 4:
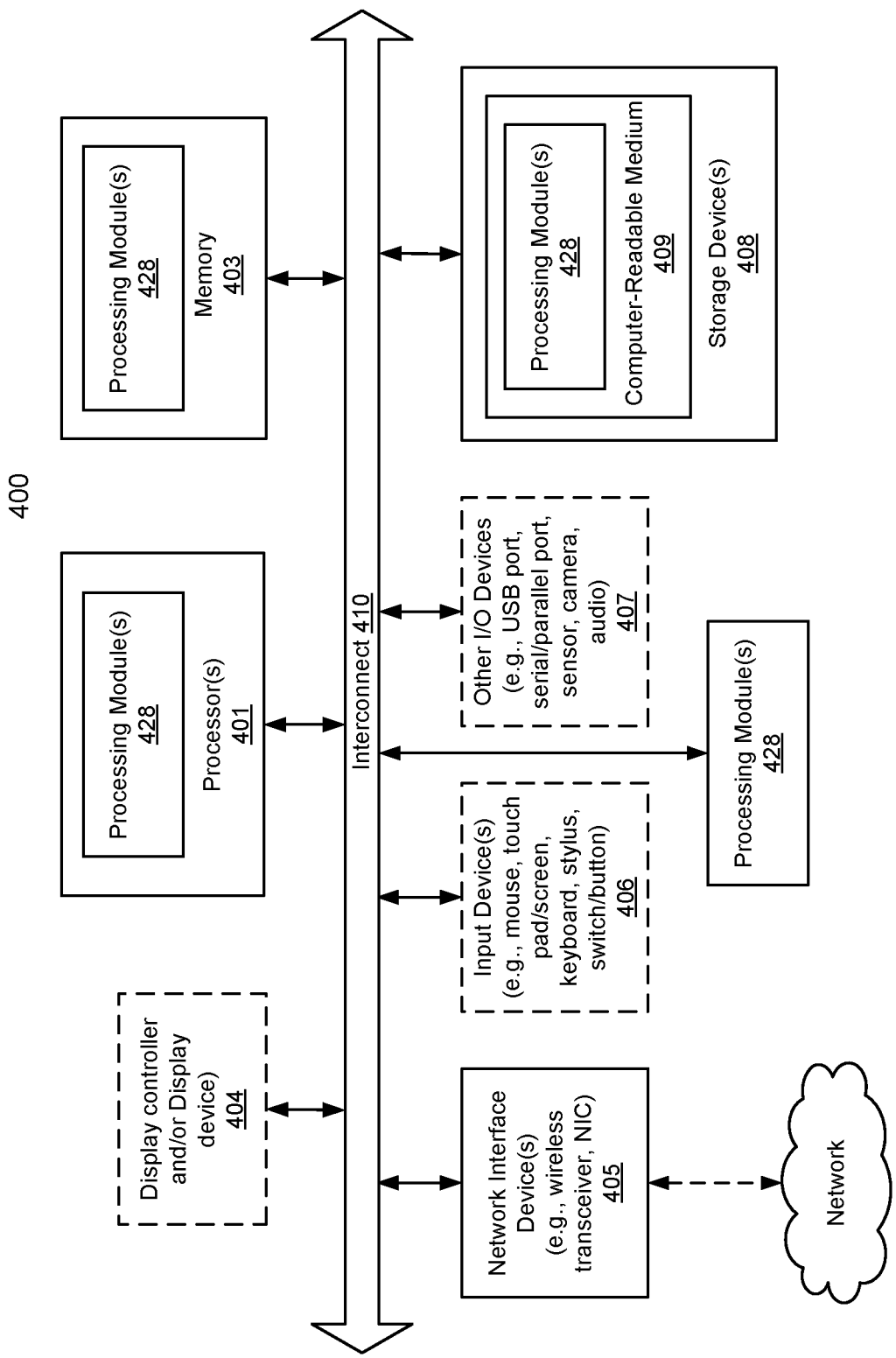
FIG. 4 shows a block diagram illustrating a data processing system in accordance with an embodiment.

Any of the components illustrated in FIGS. 1-2O may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein.

Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A human interface device, comprising:
a body movable though application of force by a user;
a magnet positioned within the body, the magnet emanating a magnetic field distribution that extends into an ambient environment that is external and proximate to the body of the human interface device;
a button mechanically coupled to the magnet via a second mechanical linkage, the second mechanical linkage being adapted to rotate the magnet in a first plane when the button is actuated by the user; and
a scroll control mechanically coupled to the magnet via a first mechanical linkage, the first mechanical linkage being adapted to rotate the magnet in a second plane when the scroll control is actuated by the user.

2. The human interface device of claim 1, wherein the human interface device is a passive device without an internal power source and without an external power source.

3. The human interface device of claim 1, wherein the first plane and the second plane are not coplanar or parallel.

4. The human interface device of claim 3, wherein the first plane is substantially perpendicular to the second plane.

5. The human interface device of claim 4, wherein the first plane is substantially orthogonal to the second plane.

6. The human interface device of claim 1, wherein the second mechanical linkage comprises:
   a support element extending from the button to the body, the support element suspending the button above the body by a first distance, and the support element flexing when the button is actuated by the user to rotate the magnet in the first plane.

7. The human interface device of claim 6, wherein the first mechanical linkage comprises:
   a cradle that houses the magnet; and
   a suspension element extending from the button toward the body by a second distance that is smaller than the first distance and positioned to suspend the cradle between the button and body.

8. The human interface device of claim 7, wherein the scroll control is directly attached to the cradle, and the suspension element flexing when the scroll control is actuated by the user to rotate the magnet in the second plane.

9. The human interface device of claim 8, further comprising:
   a second button mechanically coupled to the magnet via the second mechanical linkage, the second mechanical linkage rotating the magnet in a first direction when the button is actuated and a second direction when the second button is actuated,
   wherein the second mechanical linkage is further adapted to return the magnet to a predetermined position while neither of the button and the second button are actuated.

10. The human interface device of claim 9, wherein the first mechanical linkage is further adapted to return the magnet to the predetermined position while the scroll control is not actuated.

11. The human interface device of claim 9, wherein the button, the scroll control, and the second button a positioned on a top surface of the human interface device.

12. The human interface device of claim 11, wherein the suspension element is adapted to flex to a first degree, the support element is adapted to flex to a second degree, and the first degree is larger than the second degree.

13. The human interface device of claim 12, further comprising:
   an actuation element extending from the button toward the body; and
   a sensory feedback element positioned between the body and the actuation element, the actuation element adapted to:
      generate an auditory signal and/or haptic when suspension element flexes to the first degree, and
      limit an extent of rotation of the magnet in the first plane.

14. The human interface device of claim 13, wherein the extent of rotation of the magnet in the second plane is limited by an extent to which the scroll control is exposed above the button and the second button.

15. A user input system, comprising:
   a human interface device comprising:
      a body movable though application of force by a user;
      a magnet positioned within the body, the magnet emanating a magnetic field distribution that extends into an ambient environment that is external and proximate to the body of the human interface device;
      a button mechanically coupled to the magnet via a second mechanical linkage, the second mechanical linkage being adapted to rotate the magnet in a first plane when the button is actuated by the user; and
      a scroll control mechanically coupled to the magnet via a first mechanical linkage, the first mechanical linkage being adapted to rotate the magnet in a second plane when the scroll control is actuated by the user; and
   a sensing system adapted to measure the magnetic field distribution emanating from the magnet.

16. The user input system of claim 15, wherein the second mechanical linkage comprises:
   a support element extending from the button to the body, the support element suspending the button above the body by a first distance, and the support element flexing when the button is actuated by the user to rotate the magnet in the first plane.

17. The user input system of claim 16, wherein the first mechanical linkage comprises:
   a cradle that houses the magnet; and
   a suspension element extending from the button toward the body by a second distance that is smaller than the first distance and positioned to suspend the cradle between the button and body.

18. A data processing system, comprising:
   a human interface device comprising:
      a body movable though application of force by a user;
      a magnet positioned within the body, the magnet emanating a magnetic field distribution that extends into an ambient environment that is external and proximate to the body of the human interface device;
      a button mechanically coupled to the magnet via a second mechanical linkage, the second mechanical linkage being adapted to rotate the magnet in a first plane when the button is actuated by the user; and
      a scroll control mechanically coupled to the magnet via a first mechanical linkage, the first mechanical linkage being adapted to rotate the magnet in a second plane when the scroll control is actuated by the user; and
   a sensing system adapted to measure the magnetic field distribution emanating from the magnet;
   a processor; and
   a memory coupled to the processor to store instructions, which when executed by the processor, cause the processor to perform operations for obtaining user input using data obtained from the sensing system.

19. The data processing system of claim 18, wherein the second mechanical linkage comprises:
   a support element extending from the button to the body, the support element suspending the button above the body by a first distance, and the support element flexing when the button is actuated by the user to rotate the magnet in the first plane.

20. The data processing system of claim 19, wherein the first mechanical linkage comprises:
   a cradle that houses the magnet; and
   a suspension element extending from the button toward the body by a second distance that is smaller than the first distance and positioned to suspend the cradle between the button and body.

\* \* \* \* \*